May 1, 1962 B. ANDREWS 3,032,228
CYLINDRICAL CONTAINER
Filed Aug. 3, 1960 2 Sheets-Sheet 1

INVENTOR.
*Benjamin Andrews,*
BY
*Paul & Paul*
ATTORNEYS.

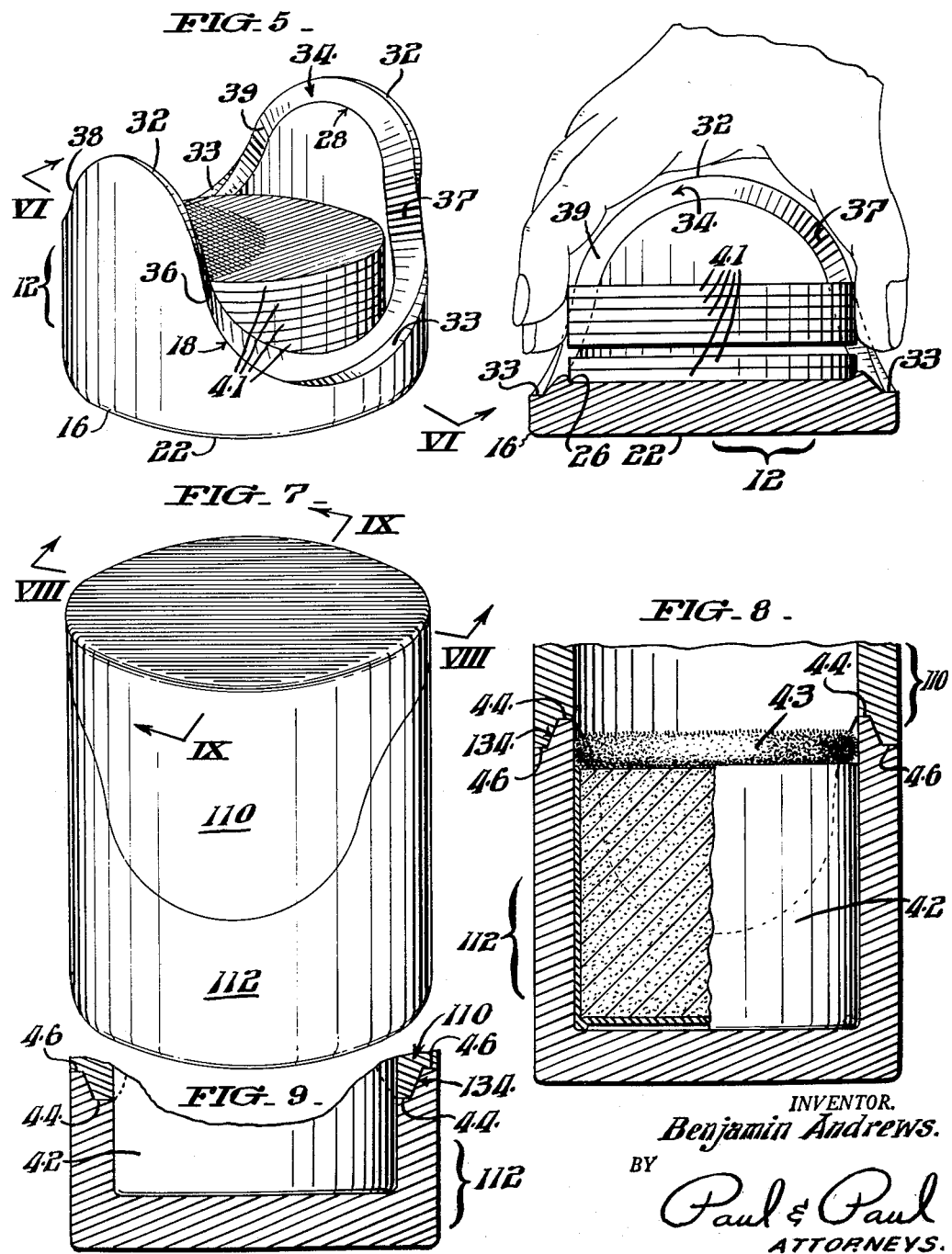

United States Patent Office 3,032,228
Patented May 1, 1962

3,032,228
CYLINDRICAL CONTAINER
Benjamin Andrews, Norristown, Pa.
(510 Chatsworth Gardens, Larchmont, N.Y.)
Filed Aug. 3, 1960, Ser. No. 47,318
9 Claims. (Cl. 220—4)

This invention relates to a two-part cylindrical container. One of the parts preferably functions as a holder when the other part is removed.

While not limited thereto, the article of my invention is particularly suited for use as a container and holder for a plurality of circular disc coasters.

My container may also be advantageously used for packaging or holding a woman's powder box and powder puff, and the like.

Other uses include bottle packaging.

An important object of my invention is to provide a hollow cylindrical container having closed ends and separable into two parts, a top or lid and a bottom or base unit. When separated, i.e., when the lid is removed, the base unit functions as a holder. The shape of the base unit is such that if a number of circular disc coasters are held therein, a desired number may be easily grasped by the hand, the remaining coasters being rejected.

A further object of my invention is to produce a container in which the top and bottom (lid and base unit) fit together in a complementary fashion with the base unit holding the lid loosely but nevertheless precluding turning or slipping thereof by reason of the fact that the contour of the edge of one part finds its matching or mating contour in the other.

Another object of my invention is to provide a container having the above characteristics and adapted to be made of molded plastic. To this end, it is desirable that the container have no lugs, bosses, or other abrupt protuberances, and that it have rounded or beveled edges to promote free flow of plastic in the mold cavity.

These and other objects of my invention will be clear from a consideration of the following detailed description of several preferred embodiments selected for illustration in the drawing wherein:

FIG. 5 is a perspective illustration of the base unit of the container of FIGS. 1 and 2 showing a group of circular disc coasters stacked therein;

FIG. 6 is an illustration in sction along the line VI—VI of FIG. 5 showing how a desired number of coasters may be readily removed from the base unit of the container;

FIG. 7 is a perspective view of an alternate form of container in which the base unit is taller than the lid; and FIGS. 8 and 9 are views in section along the lines VIII—VIII and IX—IX of FIG. 7 looking in the direction of the arrows.

Figure 1:
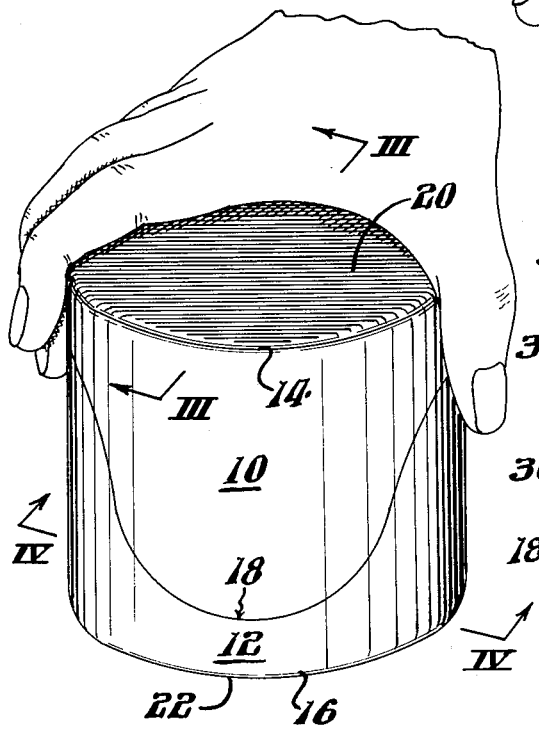
FIG. 1 is a perspective view of a container according to my invention.

In describing the preferred embodiments of my invention illustrated in the drawing, specific terminology has been resorted to for the sake of clarity. However, it is not my intention to be limited to the specific terms so selected, and it is to be understood that each specific term includes all technical equivalents which operate in a similar manner to accomplish a similar purpose.

Figure 2:
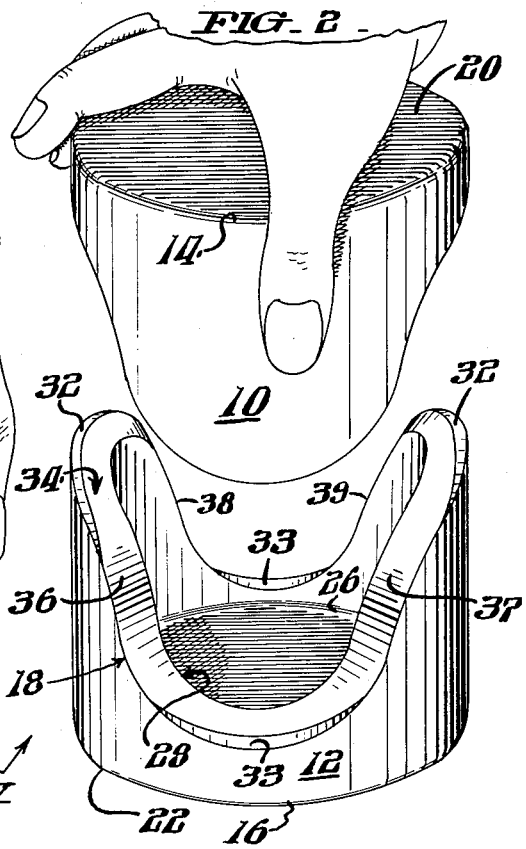
FIG. 2 is a perspective view of the same container showing the lid being lifted from the base unit.
Figure 3:
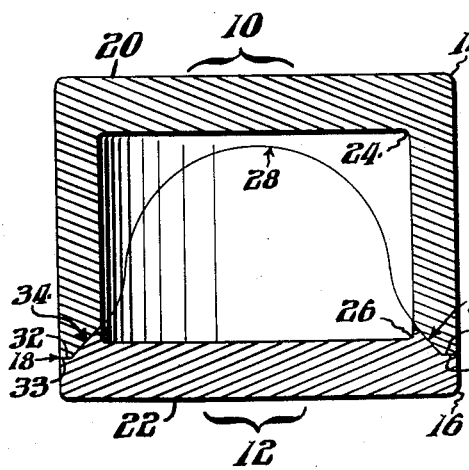
FIGS. 3 and 4 are views in section along the lines III—III and IV—IV respectively of FIG. 1 looking in the direction of the arrows.
Figure 4:
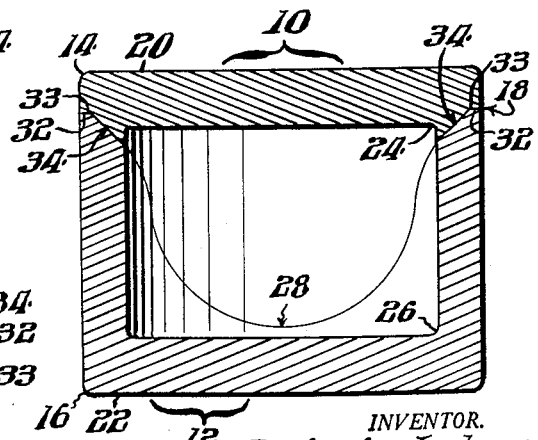

Referring now to the drawing, and particularly to FIGS. 1-6, the container there shown comprises a top or lid 10 and a bottom or base unit 12, each identical to the other. When lid 10 and base unit 12 are placed together, one on the other, the exterior shape of the closed container is that of a cylinder with rounded annular edges 14, 16, and marked by a severance or parting line 18. Parting line 18 traverses an approximately sinusoidal path around the cylinder and, in the particular container illustrated in the drawing, defines two complete cycles. In other words, the wavelength of the sine-like path 18 is one-half the exterior circumference of the container. The base plane for the sinusoidal path is parallel to and located between the two plane surfaces 20 and 22 which define the top and bottom outer surfaces of the cylindrical container. In the particular embodiment shown in FIGS. 1-6, in which the lid 10 and base unit 12 are identical to each other, the base plane for the sinusoidal path is midway between the top and bottom surfaces 20, 22 of the container. However, in the embodiment shown in FIGS. 7 and 8, in which the base is taller than the lid, the plane of the sinusoidal path is not midway between the top and bottom of the container.

The interior of the cylindrical container is also of cylindrical shape with rounded annular corners 24 and 26. The interior of the container is also marked by a severance or parting line 28 which follows an approximately sinusoidal path around the inner wall, and is of two-cycles length. The base plane for the sinusoidal path of parting line 28 of the inner cylinder wall is the same as that for the parting line 18 of the exterior wall. The inner and outer walls of the cylindrical container have approximately the same axis of revolution and approximately the same center point.

Ignoring the beveled edge or chamfer 32 of the peaked portions of the edge 34 of base unit 12, and ignoring the ledge 33 of the valley portions of the base unit which mates with a chamfer of the peak portion of the lid 10, the edge 34 of base unit 12 (and also the edge of lid 10 which is identical thereto) has, as has already been indicated, a generally sine-like configuration, rising and falling above and below an imaginary horizontal plane located approximately midway between the peaks and valleys of the sine-like curve of edge 34. While both the inner and outer parting lines are of generally sine-like configuration, neither is a pure sine wave. To the contrary, each is a modified sine wave, i.e., a first sine wave modified by a second sine wave. The first sine wave is that of edge 34, prior to modification, rising and falling above and below a horizontal plane located midway between the end surfaces of the cylindrical container. The second or modifying sine wave is one which follows the center line of unmodified edge 34 as an axis and which rotates alternately thereabout, to the right and to the left, approximately 90° in each direction completing two cycles around the circumference of the cylinder, the zero amplitude points of said second sine wave coinciding with those of the first. In so doing the second sine wave adds to and subtracts from the first sine wave, leaving four points at which the first sine wave is unaltered. The four points are identified in FIG. 2 by the reference numerals 36, 37, 38 and 39. A line drawn between points 36 and 39 will intersect a line drawn between points 37 and 38 at the center of the cylindrical container, and these two lines will lie in the same horizontal plane. Between points 36 and 37, and also between points 38 and 39, the surface of edge 34 inclines downwardly outwardly, while between points 36 and 38, and also between points 37 and 39, the surface of edge 34 inclines upwardly outwardly.

As previously indicated, the foregoing description of edge 34 as having a configuration corresponding to a first sine wave modified by a second sine wave ignores the chamfer 32 and the ledge 33. As also previously indicated, ledge 33 mates with a chamfer on the peaked portion of lid 10 corresponding to chamfer 32 of the base unit. These chamfers and mating ledges are employed when the container is made of molded plastic in order to permit the free flow of plastic to all corners of the mold cavity. Such chamfers and ledges are unnecessary where the container is made of metal or wood.

The surface of edge 34 of the base unit 12, and also the edge of lid 10, may also be looked upon as generated by the rotation of a radial line which extends horizontally outwardly from a center point located between the two parallel planes which define the top and bottom surfaces of the cylinder and midway between the peaks and valleys of the basic sinusoidal configuration of the mating edges of the lid 10 and base unit 12. While rotating, the radial line now being described moves up and down defining a sinusoidal path and in so doing generates the edge surface 34 of base unit 12 and its mating surface in lid 10.

Speaking in more general terms insofar as the sinusoidal edge is concerned, the cylindrical container in a preferred form (FIGS. 1-6) is separable into two pieces, each saddle-like in shape and appearance. And because of the sloping and complementing contours of the sinusoidal edges of each piece, the lid 10 tends to be self seating when dropped on to the base unit 12 in an orientation approaching that of its final mating position.

In the embodiment illustrated in FIGS. 1 through 6, the base unit 12 and lid 10 are of identical size and shape, although not necessarily of the same color. Thus, both the base unit 12 and the lid 10 may be made in the same mold, assuming the material of which the container is made to be moldable, such as plastic. I prefer foam polystyrene, such as Dylite, a product of Koppers Co., Inc.

With respect now to the utility of the container, FIGS. 5 and 6 illustrate the container (or at least the base unit 12) being used as a coaster holder, while FIGS. 7, 8 and 9 illustrate the container being used as a holder for a powder box and puff. In FIG. 6, an upper group of coasters 41 are shown being removed, leaving two coasters in the base unit. Removal of the lower coasters is facilitated by the fact that the edge 34 of the base unit 12 slopes downwardly outwardly in the valley regions of the sinusoid, thereby allowing the fingers to slide inwardly upwardly thereover.

When the container is intended for use as a holder for a woman's powder box and puff, and the like, as illustrated in FIG. 8, 42 being the powder box and 43 being the puff, the base unit 112 and lid 110 are not identical, the base unit 112 being taller. In addition, at the peak portions of the sinusoid, the edge 134 of the base unit 112 is high on the inside as shown at 44, rather than on the outside as in the embodiment illustrated in FIGS. 1-6. Although not essential, the location of the high edge on the inside is preferable in that it helps to maintain the puff 43 in position. The edge 134 of the base unit 112 is, in such case, generated in the first manner previously described with respect to edge 34 of base unit 12 (wherein a second sine wave is rotationally imposed on a first sine wave) but the phase of the second sine wave is reversed, i.e., the second sine wave in the case of edge 134 of base unit 112 is 180° out of phase with the second sine wave employed to generate edge 34 of base unit 12. Thus, in the case of base 112, the edge 134, in the valley portions of the sinusoid, is high on the outside, as seen at 46 in FIG. 9.

For some uses, such as bottle packaging, it may be desirable that the lid be much longer (taller) than the base unit, thereby to expose the bottle when the lid is removed. This, of course, is readily accomplished. In brief, by varying the location of the sinusoidal edge relative to the floor of the base unit and top of the lid, various results can be achieved, extending all the way from a very shallow base unit and tall lid to a tall base unit and shallow lid.

While the preferred embodiments of my invention have been described in some detail, it will be obvious to one skilled in the art that various modifications may be made without departing from the invention as hereinafter claimed.

Having described my invention, I claim:

1. A holder for cylindrical shaped articles comprising a base unit having a circular disc floor and a cylindrical wall the height of which varies according to a sinusoidal curve consisting a plurality of complete cycles not less than two and not greater than four, the edge surface of said sinusoidal wall sloping downwardly alternately inwardly and outwardly according to a second sinusoidal curve having the same number of cycles as said first-mentioned sinusoidal curve, the zero amplitude points of said second curve coinciding with those of said first-mentioned curve.

2. A holder as claimed in claim 1 further characterized in the provision of a lid having a cylindrical wall which mates with that of said base unit to form a closed cylindrical container.

3. A holder as claimed in claim 1 further characterized by the provision of a lid having a shape and size identical to that of said base unit.

4. A holder as claimed in claim 1 further characterized in that the edge surface of said wall slopes inwardly downward at the peak portions of the sinusoid and outwardly downward at the valley portions.

5. A holder as claimed in claim 1 further characterized in that the edge surface of said wall slopes inwardly downward at the valley portions of the sinusoid and outwardly downward at the peak portions.

6. A holder for cylindrical shaped articles comprising a base unit having a circular disc floor and a cylindrical wall the height of which varies according to a sinusoidal curve consisting of two complete cycles the valley portions of which approach said floor, the edge surface of said sinusoidal wall sloping downwardly alternately inwardly and outwardly according to a second sinusoidal curve consisting of two complete cycles, the zero amplitude points coinciding with those of said first-mentioned sinusoidal curve.

7. A holder as claimed in claim 6 further characterized by the provision of a lid having a shape and size identical to that of said base unit.

8. A holder as claimed in claim 6 further characterized in that the edge surface of said wall slopes inwardly downward at the peak portions of the sinusoid and outwardly downward at the valley portions.

9. A holder as claimed in claim 6 further characterized in that the edge surface of said wall slopes inwardly downward at the valley portions of the sinusoid and outwardly downward at the peak portions.

References Cited in the file of this patent

UNITED STATES PATENTS

| 119,603 | Gunning | Oct. 3, 1871 |
| 2,006,212 | Grabler | June 25, 1935 |
| 2,417,195 | Hargreaves | Mar. 11, 1947 |

FOREIGN PATENTS

| 916,846 | France | Aug. 26, 1946 |